(12) United States Patent
Shin et al.

(10) Patent No.: US 10,508,176 B2
(45) Date of Patent: Dec. 17, 2019

(54) FOAMABLE RESIN COMPOSITION FOR FOAM SHEET, FOAM SHEET, PROCESS FOR PREPARING PARTICULATE POLYLACTIC ACID AND PROCESS FOR PREPARING FOAM SHEET

(71) Applicant: LG HAUSYS, LTD., Seoul (KR)

(72) Inventors: Jun-Beom Shin, Suwon-si (KR); Sung-Yong Kang, Anyang-si (KR); Min-Hee Lee, Gunpo-si (KR); Hea-Won Kwon, Seoul (KR); Kyoung-Min Kang, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 52 days.

(21) Appl. No.: 15/874,632

(22) Filed: Jan. 18, 2018

(65) Prior Publication Data

US 2018/0142069 A1    May 24, 2018

Related U.S. Application Data

(62) Division of application No. 14/913,994, filed as application No. PCT/KR2014/008058 on Aug. 29, 2014, now abandoned.

(30) Foreign Application Priority Data

Aug. 29, 2013    (KR) ........................ 10-2013-0103466

(51) Int. Cl.
| | |
|---|---|
| *C08J 3/12* | (2006.01) |
| *B29C 48/00* | (2019.01) |
| *B01J 2/02* | (2006.01) |
| *B29B 9/10* | (2006.01) |
| *B29C 44/50* | (2006.01) |
| *C08J 5/18* | (2006.01) |
| *B29B 9/12* | (2006.01) |
| *B29C 48/30* | (2019.01) |
| *B29C 48/305* | (2019.01) |
| *B29K 67/00* | (2006.01) |
| *B29K 105/00* | (2006.01) |
| *B05B 5/00* | (2006.01) |

(52) U.S. Cl.
CPC . *C08J 3/12* (2013.01); *B01J 2/02* (2013.01); *B29B 9/10* (2013.01); *B29B 9/12* (2013.01); *B29C 44/505* (2016.11); *B29C 48/0012* (2019.02); *B29C 48/0021* (2019.02); *C08J 3/122* (2013.01); *C08J 5/18* (2013.01); *B05B 5/001* (2013.01); *B29C 48/30* (2019.02); *B29C 48/305* (2019.02); *B29K 2067/046* (2013.01); *B29K 2105/251* (2013.01); *C08J 2367/04* (2013.01)

(58) Field of Classification Search
CPC ......... C08J 2367/04; C08J 3/122; B29B 9/10; B05B 5/001; B29C 44/505; B29K 2067/046

See application file for complete search history.

(56) References Cited

U.S. PATENT DOCUMENTS

| | | | |
|---|---|---|---|
| 4,315,845 A * | 2/1982 | Takahashi | ................ C09D 5/03 523/400 |
| 6,753,454 B1 | 6/2004 | Smith et al. | |
| 2004/0146540 A1 | 7/2004 | Ueda et al. | |
| 2006/0222980 A1* | 10/2006 | Makino | ...................... B01J 2/04 430/105 |
| 2010/0038830 A1 | 2/2010 | Lahann et al. | |
| 2014/0235741 A1 | 8/2014 | Shinohara et al. | |

FOREIGN PATENT DOCUMENTS

| | | |
|---|---|---|
| CN | 1810877 A | 8/2006 |
| CN | 101646539 A | 2/2010 |
| CN | 102369234 A | 3/2012 |
| EP | 0488218 A2 | 6/1992 |
| EP | 1683828 A2 | 7/2006 |
| JP | 2000136261 A | 5/2000 |
| JP | 2013531746 A | 8/2013 |
| JP | 2013199532 A | 10/2013 |
| KR | 1020060086288 A | 7/2006 |
| KR | 100900251 B1 | 5/2009 |
| KR | 10201000015654 A | 2/2010 |
| KR | 101050338 B1 | 7/2011 |

(Continued)

OTHER PUBLICATIONS

Kenawy et al "Release of tetracycline hydrochloride from electrospun poly(ethylene-co-vinylacetate), poly(lactic acid), and a blend", Journal of Controlled Release 81 (2002) 57-64, published on Mar. 2002.*

(Continued)

*Primary Examiner* — Gregory Listvoyb
(74) *Attorney, Agent, or Firm* — Hauptman Ham, LLP

(57) ABSTRACT

Disclosed herein is a foamable resin composition for a foam sheet including polylactic acid resin particles, each of the particles having a particle size of about 1 μm to about 100 μm. A process for preparing a particulate polylactic acid resin includes: introducing a polylactic acid resin and then forming a molten polylactic acid spray solution; and injecting the molten polylactic acid spray solution by a melt spray method and simultaneously cooling the molten polylactic acid spray solution to obtain a particulate polylactic acid. In addition, disclosed herein is a process for preparing a foam sheet using the foamable resin composition for a foam sheet including a polylactic acid resin.

9 Claims, 2 Drawing Sheets

(56) References Cited

FOREIGN PATENT DOCUMENTS

KR   1020130067119 A   6/2013
WO      2012157875 A2   11/2012

OTHER PUBLICATIONS

Kate Parker et al., "Expanded polylactic acid—an eco-friendly alternative to polystyrene foam", Journal of Cellular Plastics, 47(3) 233-243, 2011.
Chinese Office Action for corresponding Chinese Patent Application No. 201480047646.3 dated Jan. 3, 2017.
International Search Report dated Dec. 8, 2014 corresponding to International Application No. PCT/KR2014/008058.
Extended European Search Report dated Aug. 2, 2016 in connection with the counterpart European Patent Application No. 14839916.5-1303.
Japanese Office Action dated Jul. 27, 2018, in connection with the Japanese Patent Application No. 2016-538855.

\* cited by examiner

FOAMABLE RESIN COMPOSITION FOR FOAM SHEET, FOAM SHEET, PROCESS FOR PREPARING PARTICULATE POLYLACTIC ACID AND PROCESS FOR PREPARING FOAM SHEET

CROSS REFERENCE TO RELATED APPLICATION

This present application is a divisional application of a pending U.S. patent application Ser. No. 14/913,994 filed on Feb. 24, 2016 which is a national stage filing under 35 U.S.C § 371 of the PCT application number PCT/KR2014/008058 filed on Aug. 29, 2014, which is based upon and claims the benefit of priority to Korean Patent Application No. 10-2013-0103466 filed on Aug. 29, 2013 in the Korean Intellectual Property Office. The disclosures of the above-listed applications are hereby incorporated by reference herein in their entirety.

TECHNICAL FIELD

The present disclosure relates to a foamable resin composition for a foam sheet, a foam sheet, a process for preparing a particulate polylactic acid resin, and a process for preparing a foam sheet.

BACKGROUND ART

Products in which a polylactic acid is used are produced through multiple heat processes. It has been reported that a polylactic acid is sensitive to heat, and, therefore, a hydrolysis proceeds at a high temperature. Due to the property of the polylactic acid, a hydrolysis caused by heat during a process for preparing a polylactic acid product leads to a change of a molecular weight, which affects the state of the end product produced.

DISCLOSURE

Technical Problem

One embodiment of the present disclosure provides a foamable resin composition for a foam sheet, which can produce a foam sheet including a polylactic acid resin and having an improved shelf-life.

Another embodiment of the present disclosure provides a process for preparing a polylactic acid resin of microparticles, included in the foamable resin composition.

Still another embodiment of the present disclosure provides a process for preparing a foam sheet, using the foamable resin composition for a foam sheet.

Technical Solution

In one embodiment of the present disclosure, a foamable resin composition for a foam sheet comprising polylactic acid resin particles, each of the particles having a particle size of about 1 µm to about 100 µm, is provided.

A foam sheet prepared by molding the composition may comprise a polylactic acid resin having a weight average molecular weight of about 100,000 to about 200,000.

The composition may be a suspension in which the polylactic acid resin particles are dispersed in a liquid solvent.

In another embodiment of the present disclosure, a foam sheet comprising polylactic acid resin particles, each of the particles having a particle size of about 1 µm to 100 µm, is provided.

The foam sheet may comprise a polylactic acid resin having a weight average molecular weight of about 100,000 to about 200,000.

In still another embodiment of the present disclosure, a process for preparing a particulate polylactic acid resin comprises: introducing a polylactic acid resin and then forming a molten polylactic acid spray solution; and spraying the molten polylactic acid spray solution by a melt spray method and simultaneously cooling the molten polylactic acid spray solution to obtain a particulate polylactic acid.

The polylactic acid resin may be introduced into an extruder, and then transferred to an spray nozzle and heated in the spray nozzle to form the molten polylactic acid spray solution.

The polylactic acid resin n the form of pellet or powder may be introduced into the extruder.

The molten polylactic acid spray solution may be introduced into the spray nozzle together with an air and then discharged.

A temperature of the air that is introduced into the spray nozzle may be of about 300° C. to about 500° C., a pressure of the air that is injected into the spray nozzle may be of about 100 psi to about 1,000 psi, an injection speed of the air that is injected into the spray nozzle may be of about 10 m/s to about 50 m/s.

A temperature of the spray nozzle may be of about 200° C. to about 400° C.

A pressure of the spray nozzle may be of about 10 psi to about 1,000 psi.

A diameter of the spray nozzle may be of about 0.5 mm to about 3.0 mm.

The molten polylactic acid spray solution may comprise at least one additive selected from the group consisting of a lubricant, a plasticizer, and a combination thereof.

The molten polylactic acid spray solution may have a viscosity of about 1,500 cps to about 2,000 cps at 250° C.

A voltage of about 2,000 V to about 50,000 V may be applied to the spray nozzle to carry out a melt electrostatic spray deposition.

The particulate polylactic acid resin may have an average particle size of about 1 µm to about 100 µm.

In still another embodiment of the present disclosure, a process for preparing a foam sheet comprising a polylactic acid foam layer, comprising: mixing a particulate polylactic acid resin having an average particle size of 1 µm to 100 µm, a foam resin, and an additive to form a foamable resin composition, and then applying the foamable resin composition to form a layer; and allowing the resultant layer to foam and consequently forming a foam layer is provided.

The particulate polylactic acid resin is obtained by a melt spray method.

The foam sheet prepared by the process may comprise a polylactic acid resin having a weight average molecular weight of about 100,000 to about 200,000.

Advantageous Effects

A foam sheet prepared by using the microparticulate polylactic acid resin has excellent durability and surface property and improved shelf-life.

BEST MODE

Figure 1:
FIG. 1 schematically shows a process flow diagram of a process for preparing a foam sheet according to one embodiment of the present disclosure.

Hereinafter, exemplary embodiments of the present disclosure will be described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.

In one embodiment of the present disclosure, polylactic acid resin particles having an average particle size of about 1 µm to about 100 µm are provided.

The polylactic acid resin particles having the particle size range may be prepared by a melt spray method. Further, more uniform polylactic acid particles may be obtained by introducing an air having a high temperature and a high pressure together to an spray nozzle during performing the melt spray method. The melt spray method may be carried out by a melt electrostatic spray deposition (melt ESD) applying a voltage during performing the melt spray method.

A process according to another embodiment of the present disclosure for preparing polylactic acid resin particles having an average particle size of about 1 µm to about 100 µm, comprises: introducing a polylactic acid resin and then forming a molten polylactic acid spray solution; and spraying the molten polylactic acid spray solution by a melt spray method and simultaneously cooling the molten polylactic acid spray solution to obtain a particulate polylactic acid.

The process for preparing a particulate polylactic acid resin has advantages to easily control the size of the polylactic acid resin particles formed by applying the melt spray method and to make a distribution of the particle size uniform. For example, ploylactic acid resin particles having an average particle size of about 1 µm to about 100 µm may be prepared by the process for preparing a particulate polylactic acid resin.

To perform the melt spray method, firstly, a polylactic acid in the form of pellet or powder is introduced into an extruder equipped with an spray nozzle, and then the polylactic acid is melted in the high temperature spray nozzle to form a molten polylactic acid spray solution. Such molten polylactic acid spray solution is sprayed in the form of a liquid droplet in micrometers. In addition, such spraying is performed in a cooling chamber, allowing the liquid droplet to be cooled to form microparticles of the polylactic acid resin.

The melt spray method is optionally carried out by a melt electrostatic spray deposition applying a voltage to the spray nozzle.

The molten polylactic acid spray solution is introduced into the spray nozzle together with an air and then discharged.

By controlling the temperature, pressure and velocity of the air that is introduced into the spray nozzle, the size and shape of a liquid droplet of the molten polylactic acid spray solution discharged may be controlled, whereby the particle size of a polylactic acid resin to be finally obtained may be controlled.

For example, a temperature of the air that is introduced into the spray nozzle may be of about 300° C. to about 500° C., a pressure of the air may be of about 10 psi to about 1,000 psi, and an injection speed of the air may be of about 10 m/s to about 50 m/s.

In the melt spray method, a viscosity of the melted polylactic acid may be controlled to be sprayed as a liquid droplet in micrometers.

To control the viscosity of the melted polylactic acid resin may be achieved by a method, such as adjusting the temperature of the spray nozzle, adding an additive, such as a lubricant, a plasticizer, or the like, together with the polylactic acid resin, to the extruder to be compounded, or introducing a gas such as $CO_2$ to the polylactic acid resin in the form of pellet, and the like.

For example, a diameter of the spray nozzle may be of about 0.5 mm to about 3.0 mm.

In particular, a viscosity of the molten polylactic acid spray solution may be of about 1,500 cps to about 2,000 cps at about 250° C. With forming a coating solution having the above viscosity range, a microparticulate polylactic acid resin may be formed.

Process conditions of the melt spray method are not particularly limited, and the known process conditions, for example, a pressure of the spray nozzle of about 100 psi to about 1,000 psi may be applied.

However, the melt spray method should be carried out at a temperature range in which the polylactic acid melts. For example, a temperature of the spray nozzle may be of about 200° C. to about 400° C.

In addition, a diameter of the spray nozzle may be of about 0.5 mm to about 3.0 mm in order to form the microparticulate polylactic acid resin as described above.

The melt spray method may be carried out, for example, by a melt electrostatic spray deposition applying a voltage of about 2,000 V to about 50,000 V to the spray nozzle.

The microparticulate polylactic acid resin which may be prepared by the process can be advantageously applied to a preparation of a foam sheet.

In another embodiment of the present disclosure, a foam sheet comprising polylactic acid resin particles, each of the particles having a particle size of about 1 µm to about 100 µm, is provided. The foam sheet may be prepared by using the polylactic acid resin particles having a small particle size in micrometers, in accordance with a process for preparing a foam sheet as mentioned below, and the thus prepared foam sheet minimizes the number of heat processes to minimize the degradation of the polylactic acid resin, allowing the maintenance of higher molecular weight. In particular, the foam sheet may comprise a polylactic acid resin having a weight average molecular weight of about 100,000 to about 200,000.

Figure 2:
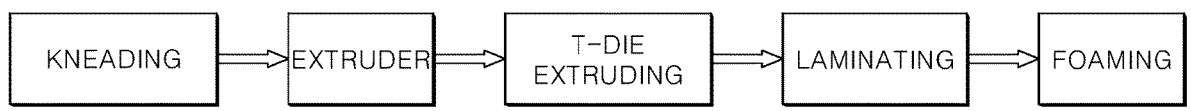
FIG. 2 schematically shows a process flow diagram of a process for preparing a foam sheet.

FIG. 2 shows a process flow diagram of an exemplary process for preparing a foam sheet. Generally, a foam sheet applied with a polylactic acid resin has been produced through a variety of processes. More specifically, a lubricant, an additive, a stabilizer, or the like is firstly added to a polylactic acid resin in the form of powder or pellet, followed by blending, kneading and T-die extrusion, and then lamination with paper and foaming process. In general, until a foam sheet is prepared by the processes, approximately at least three or four heat processes are performed.

However, a polylactic acid resin is known to be sensitive to heat treatment since it is hydrolyzed at a high temperature. Due to the property of the polylactic acid resin, the hydrolysis of the foam sheet, applied with the polylactic acid resin, by heat during a process affects the molecular weight of the polylactic acid resin to result in the degradation of a product.

In still another embodiment of the present disclosure, a process for preparing a foam sheet, capable of reducing the number of heat processes by using a microparticulate polylactic acid resin, is provided.

In one embodiment, a process for preparing a foam sheet comprising a polylactic acid foam layer, comprising: mixing a particulate polylactic acid resin having an average particle size of about 1 μm to about 100 μm, a foam resin, and an additive to form a foamable resin composition, and then appling the foamable resin composition to form a layer; and allowing the resultant layer to foam and consequently forming a foam layer is provided.

The foamable resin composition allows the polylactic acid resin to be mixed in a microparticle size to form a suspension. Specifically, the foamable resin composition in the form of sol-gel may foams to form a polylactic acid foam layer.

FIG. 1 shows a process flow diagram of a process for preparing a foam sheet according to one embodiment of the present disclosure. A powder of polylactic acid particles having a micro size is firstly prepared by applying a melt spray method (FIG. 1, MELT ESD step); a suspension is prepared by mixing a foamable resin composition comprising the powder of polylactic acid particles having a micro size (FIG. 1, MIXING (PREPARING SOL) step); a coating layer is formed by coating the suspension on a substrate (FIG. 1, SOL COATING step); and, subsequently, the coating layer foams (FIG. 1, FOAMING step) to form a foam layer, whereby a foam sheet may be prepared.

By the process for preparing a foam sheet, a foam sheet comprising a polylactic acid foam layer comprising the above polylactic acid resin particles having an average particle size of about 1 μm to about 100 μm may be prepared.

The foam resin may be a material used in preparing a foam layer of a foam sheet, such as PVC, polyurethane, and the like, without being limited thereto.

In the foam layer formed as described above, the microparticles of the polylactic acid resin are evenly dispersed. Since the polylactic acid resin is evenly dispersed, the surface property of the product, the foam sheet finally produced, may be improved, whereby the durability of the foam sheet is enhanced.

Since the process for preparing a foam sheet may reduce the number of heat processes, compared with the well-known processes for preparing a foam sheet, the damage resulting from a hydrolysis of a polylactic acid resin may be remarkably lowered, whereby the loss of the molecular weight by the hydrolysis of the polylactic acid resin may be inhibited. Therefore, the foam sheet prepared by the above process unexpectedly improves the product degradation by heat processes to result in an extended shelf-life.

In the foam sheet produced by the above process for preparing a foam sheet, the molecular weight of the microparticulate polylactic acid resin may be maintained without a remarkable loss resulting from a hydrolysis. For example, the foam sheet produced by the above process for preparing a foam sheet may comprise a polylactic acid resin having a weight average molecular weight of about 100,000 to about 200,000.

Particularly, the foam sheet produced by the above process for preparing a foam sheet may comprise a polylactic acid resin having a weight average molecular weight of about 100,000 or more.

Hereinafter, the present disclosure will be explained in more detail with reference to an example and a comparative example. However, it should be understood that these examples are provided for illustration only and are not to be in any way construed as limiting the present disclosure.

EXAMPLES

Example 1

Using a polylactic acid resin in the form of pellet, particles having an average particle size of 50 μm were prepared by a melt electrostatic spray deposition. On performing the melt electrostatic spray deposition, a temperature of an spray nozzle was 250° C., a pressure of the spray nozzle was 500 psi, and a diameter of the spray nozzle was 1 mm, a voltage of 20,000 V was applied to the spray nozzle, and a viscosity of a molten polylactic acid spray solution was 2,000 cps at 250° C.

The resulting polylactic acid particles, and additives including a plasticizer, a stabilizer, a lubricant and the like were added and blended to prepare a polylactic acid resin-containing sol. The resulting polylactic acid resin-containing sol was subjected to a sol-gel coating on a substrate, followed by drying (foaming) to obtain a foam sheet sample having a thickness of about 0.5 mm.

Comparative Example 1

Additive including a plasticizer, a stabilizer, a lubricant and the like was added to a polylactic acid resin in the form of pellet as in Example 1 and mixed to prepare a polylactic acid resin-containing mixture composition. The polylactic acid resin-containing mixture composition was kneaded at 150° C. with a Banbury mixer, and the first and the second mixing were conducted with two roll mill at 150° C. The thus prepared mixing materials were subjected to calendering process and foaming process to obtain a foam sheet having a thickness of about 0.5 mm.

Evaluation

Experiment 1: Polylactic Acid Molecular Weight Determination

With respect to the foam sheet samples prepared in Example 1 and Comparative Example 1, the weight average molecular weights thereof were determined with the GPC (gel permeation chromatography) (e2695, Waters), and shown in Table 1.

Experiment 2: Durability Evaluation

Each of the foam sheets prepared in Example 1 and Comparative Example 1 was determined for its impact resistance according to the ASTM D256 method, and results are shown in Table 1.

Experiment 3: Surface Property Evaluation

The surface property of each of the foam sheets prepared in Example 1 and Comparative Example 1 were visually determined, and shown in Table 1. The evaluation criteria are visual assessment and the surface property was scored from 5 (excellent) to 1 (NG) using a 5-point scale.

TABLE 1

| Items | Polylactic acid particles before preparation of foam sheet of Example 1 | Polylactic acid in foam sheet of Example 1 | Polylactic acid in foam sheet of Comparative Example 1 |
|---|---|---|---|
| Weight average molecular weight | 150,000 | 120,000 | 80,000 |
| Impact resistance [kgf · cm/cm] | — | 20 | 30 |
| Surface Property | — | Blocking: 5<br>Blushing: 4 | Blocking: 4<br>Blushing: 3 |

The invention claimed is:

1. A process for preparing a particulate polylactic acid resin comprising:
   introducing a polylactic acid resin into an extruder;
   forming a molten polylactic acid spray solution by transferring the polylactic acid resin to an spray nozzle and heating the polylactic acid resin in the spray nozzle; and spraying the molten polylactic acid spray solution by a melt spray method and simultaneously cooling the molten polylactic acid spray solution to obtain a particulate polylactic acid, wherein a voltage ranging from 2,000 V to 50,000 V is applied to the spray nozzle to carry out a melt electrostatic spray deposition.

2. The process according to claim 1, wherein the molten polylactic acid spray solution is introduced into the spray nozzle together with an air and then discharged.

3. The process according to claim 2, wherein a temperature of the air that is injected into the spray nozzle is of 300° C. to 500° C., a pressure of the air that is injected into the spray nozzle is of 100 psi to 1,000 psi, and an injection speed of the air that is injected into the spray nozzle is of 10 m/s to 50 m/s.

4. The process according to claim 1, wherein a temperature of the spray nozzle is of 200° C. to 400° C.

5. The process according to claim 1, wherein a pressure of the spray nozzle is of 10 psi to 1,000 psi.

6. The process according to claim 1, wherein a diameter of the spray nozzle is of 0.5 mm to 3.0 mm.

7. The process according to claim 1, wherein the molten polylactic acid spray solution comprises at least one additive selected from the group consisting of a lubricant, a plasticizer, and a combination thereof.

8. The process according to claim 1, wherein the molten polylactic acid spray solution has a viscosity of 1,500 cps to 2,000 cps at 250° C.

9. The process according to claim 1, wherein the particulate polylactic acid resin has an average particle size of 1 μm to 100 μm.

* * * * *